United States Patent
Sato et al.

(10) Patent No.: US 7,722,107 B2
(45) Date of Patent: May 25, 2010

(54) VEHICULAR CENTER CLUSTER PANEL

(75) Inventors: Takahiko Sato, Aichi-ken (JP);
Masanobu Tomida, Aichi-ken (JP);
Shigeru Yabuya, Aichi-ken (JP);
Kiyoshi Suenaga, Aichi-ken (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 2 days.

(21) Appl. No.: 12/216,621

(22) Filed: Jul. 8, 2008

(65) Prior Publication Data

US 2009/0015031 A1 Jan. 15, 2009

(30) Foreign Application Priority Data

Jul. 10, 2007 (JP) ............................. 2007-180942

(51) Int. Cl.
*B60J 7/00* (2006.01)
(52) U.S. Cl. ......................................... 296/70; 180/90
(58) Field of Classification Search .................. 296/70; 180/90; 280/752
See application file for complete search history.

(56) References Cited

U.S. PATENT DOCUMENTS 4,475,614 A * 10/1984 Takamatsu et al. ............ 180/90
6,110,037 A * 8/2000 Yoshinaka ................... 454/143

FOREIGN PATENT DOCUMENTS

JP A-2003-146111 5/2003

* cited by examiner

*Primary Examiner*—Jospeh D Pape
(74) *Attorney, Agent, or Firm*—Posz Law Group, PLC (57) ABSTRACT

A center cluster panel 2 is formed with a projected portion 20 including an upper panel 21 extended to a vehicle rear side and disposed at an uppermost portion thereof, a curved face panel 22 connected to a rear portion of the upper panel 21 and directed to a vehicle front side by being bent from the connected portion 24, and a lower panel 23 connected to the curved face panel 22, extended to a front side and disposed on a vehicle lower side of the upper panel 21. The upper panel 21 and the lower panel 23 are formed such that respective wall thicknesses t1 and t2 are uniform. The wall thickness t1 of the upper panel 21 is made to be thicker than the wall thickness t2 of the lower panel 23. The curved face panel 22 is formed such that a wall thickness t3 thereof is equal to the wall thickness t1 of the upper panel 21 at the portion 24 connected with the upper panel 21 and formed such that the more proximate to the lower panel 23 from the connected portion 24, the more thinned the wall thickness t3 gradually.

5 Claims, 7 Drawing Sheets

VEHICULAR CENTER CLUSTER PANEL

BACKGROUND OF THE INVENTION

1. Field of the Invention

The present invention relates to a center cluster panel constituting a portion of an instrument panel of a vehicle.

2. Description of the Related Art

Figure 9:
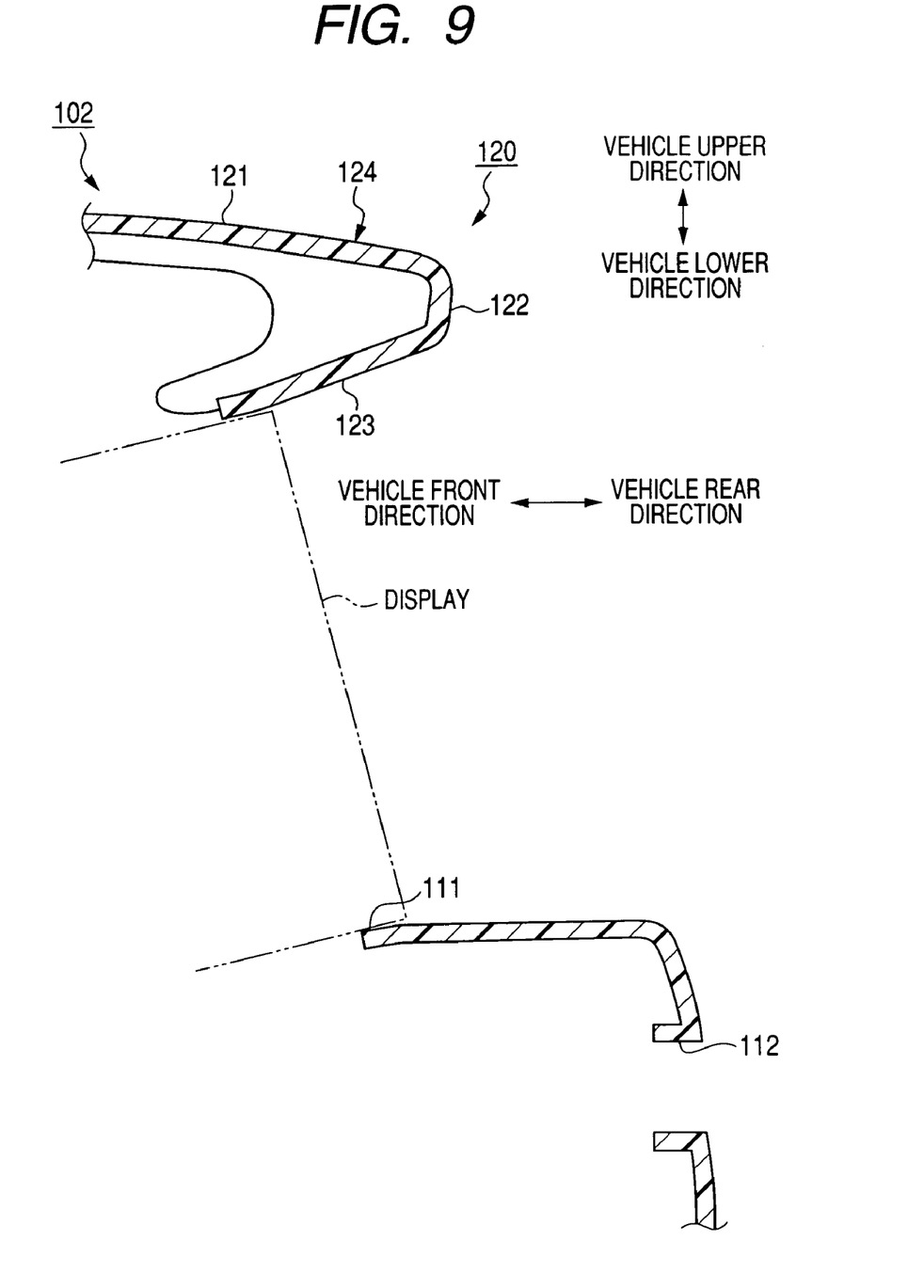
FIG. 9 is a partial sectional view showing a partial sectional structure of a center cluster of a background art.

As described in, for example, Patent Reference 1, an instrument panel arranged on front sides of a driver seat and a passenger seat of a vehicle is attached with a center cluster panel made of a resin provided with various instruments and switches. FIG. 9 is a sectional view showing a sectional structure of an example of the center cluster panel.

As shown by FIG. 9, a center cluster panel 102 is formed with a containing portion 111 for containing, for example, a display panel of a car navigation system or an audio apparatus, and an attaching portion 112 for attaching an operation dial of an air conditioner. Further, the center cluster panel 102 is formed with a projected portion 120 projected to a rear side of a vehicle at an upper portion thereof. The projected portion 120 is constituted by an upper panel 121 extended to a rear side of the vehicle and disposed at an uppermost portion of the cluster panel 102, a curved face panel 122 connected to a portion on a rear side of the vehicle of the upper panel 121 and directed to a front side of the vehicle by being bent from a connected portion 124 of the same, and a lower panel 123 connected to the curved face panel, extended to the front side of the vehicle and disposed on a lower side of the vehicle of the upper panel 121. The projected portion 120 functions as an "eaves" for restraining outer light of the vehicle from being directly incident on a display or the like disposed on a lower side thereof to deteriorate an optical recognizability thereof, further, contributes to also promotion of a beautiful outlook of the center cluster panel 102.

Meanwhile, when a passenger falls to the front side of the vehicle in impacting the vehicle, there is a concern that the head portion of the passenger is brought into contact with the projected portion 120 of the center cluster panel 102. Therefore, according to the center cluster panel 102, a wall thickness thereof is set such that even when the head portion of the passenger is brought into contact with the projected portion 120 in impacting the vehicle, a rigidity substantially capable of absorbing the impact by deforming the projected portion 120 is provided.

Patent Reference 1: JP-A-2003-146111

Meanwhile, in recent years, in order to achieve light-weighted formation of the vehicle, it is desired to make a wall thickness of a center cluster panel as thin as possible including the above-described projected portion. However, when the wall thickness of the center cluster panel, particularly, the wall thickness of the projected portion having a possibility of being brought into contact with the passenger is simply made thin uniformly, the rigidity is reduced and there is a concern of bringing about a crack at the projected portion by bringing the head portion of the passenger into contact with the projected portion in impacting the vehicle. Further, when the crack is brought about at the projected portion in this way, there is a concern of deteriorating an impact absorbing function of the projected portion as described above.

SUMMARY OF THE INVENTION

The invention has been carried out in view of the actual situation and it is an object thereof to provide a vehicular center cluster panel capable of maintaining an impact absorbing function in impacting a vehicle of a projected portion while achieving light-weighted formation by making a wall thickness as thin as possible.

Means for resolving the problem and operation and effect thereof will be described as follows.

A first aspect of the invention constitutes a gist thereof by a center cluster panel made of a resin attached to a center portion in a vehicle width direction of an instrument panel of a vehicle formed with a projected portion including an upper panel extended to a rear side of the vehicle and disposed at a topmost portion of the center cluster panel, a curved face panel connected to a rear side portion of the vehicle of the upper panel and directed to a front side of the vehicle by being bent from the connected portion, and a lower panel connected to the curved face panel, extended to a front side of the vehicle and disposed on a lower side of the vehicle of the upper panel, wherein the upper panel and the lower panel are formed such that respective wall thicknesses thereof become uniform, the wall thickness of the upper panel is set to be thicker than the wall thickness of the lower panel, a wall thickness of the curved face panel is formed to be equal to the wall thickness of the upper panel at the connected portion with the upper panel and the wall thickness is formed such that the more proximate to the lower panel from the connected portion, the thinner the wall thickness gradually.

According to the constitution, with regard to the upper panel having a high possibility of being brought into contact with the head portion of the passenger fallen to the front side in impacting the vehicle, a wall thickness thereof is set to be thicker than the wall thickness of the lower panel having a low possibility of the contact. Therefore, the rigidity of the upper panel is ensured even when light-weighted formation of the center cluster panel is achieved by thinning the wall thickness of the projected portion, and therefore, a crack is not brought about when the head portion of the passenger is brought into contact therewith and an impact force thereof can preferably be absorbed.

Further, in a case in which a constitution in which the wall thickness of the projected portion partially differs is adopted at the center cluster panel in this way, when a portion of significantly changing the wall thickness is present, in a case of bringing the head portion of the passenger and the upper panel into contact with each other in impacting the vehicle, there is a concern that a stress is concentrated on the portion by an impact force and crack is brought about at the portion. Further, when crack is brought about at the projected portion of the center cluster panel, there is a concern of reducing the impact absorbing function of the projected portion.

In this respect, according to the above-described constitution, there is not a portion of rapidly changing the wall thickness in the curved face panel of connecting the upper panel and the lower panel having different wall thicknesses, and therefore, the above-described stress concentration can be restrained from being brought about and it can preferably be avoided that the impact absorbing function of the projected portion is reduced owing to an occurrence of the crack.

Further, by setting the wall thickness of the curved face panel in this way, the more proximate the portion of the curved face panel to the lower panel, that is, the more at the portion having a low possibility of being brought into contact with the head portion of the passenger in impacting the vehicle, the thinner the wall thickness is set, and therefore, light-weighted formation of the center cluster panel can preferably be achieved while maintaining the impact absorbing function of the projected portion.

A second of the invention constitutes a gist thereof by that the wall thickness of the curved face panel is formed to be equal to the wall thickness of the lower panel at a center portion between the upper panel and the lower panel in the vehicular center cluster panel.

As described above, the more proximate the portion of the curved face panel to the upper panel, the higher the possibility of being brought into contact with the head portion of the passenger in impacting the vehicle. In other words, the more proximate the portion of the curved face panel to the lower panel, the lower the possibility of being brought into contact with the head portion of the passenger in impacting the vehicle. Therefore, as in the constitution described, whereas with regard to the portion of the curved face panel on the side of the upper panel from the center portion, the more proximate to the upper panel, the thicker the wall thickness of the portion, with regard to the portion on the side of the lower panel from the center portion, by making the wall thickness equal to that of the lower panel to be thinned relatively, the rigidity can be ensured in conformity with the mode of being brought into contact with the head portion of the passenger in impacting the vehicle while achieving light-weighted formation of the center cluster panel.

As described above, according to the vehicular center cluster panel according to the invention, the impact absorbing function of the projected portion in impacting the vehicle can be maintained while achieving light-weighted formation by making the wall thickness as thin as possible.

BRIEF DESCRIPTION OF THE DRAWINGS

FIG. 1 (a) is a perspective view showing a perspective structure of a vehicular center cluster panel according to an embodiment of the invention and (b) is a sectional view taken along a line B-B of the perspective view.

DESCRIPTION OF THE PREFERRED EMBODIMENTS

An embodiment of a vehicular center cluster panel (hereinafter, simply referred to as center cluster panel) according to the invention will be explained in reference to FIG. 1 through FIG. 4 as follows. Further, in the embodiment, as a material of forming the center cluster panel, a resin material excellent in an impact absorbing property is adopted. Specifically, as physical properties of the material, it is preferable that an elastic modulus of bending at 23° C. is 2500 MPa through 3300 MPa, a measured value by Izod test at 23° C. is 20 J/m through 260 J/m and a melt mass flow rate (MFR) is 30 through 60 g/10 min (further preferably, 40 through 50 g/10 min). As a material for realizing the physical properties of the material, it is preferable to constitute a major component by, for example, block polypropylene (block PP), which is added with rubber (SEBS, EP, EBM) and talc by pertinent weight %. Examples of the blend material and a blend rate thereof are respectively shown in Tables 1 and 2. Here, as talc, mixed talc of an average particle size of 4 through 5 μm mixed with talc of a particle size of 1 μm and talc of a particle size of 4 through 5 μm is adopted.

TABLE 1

| blend material | blend rate (weight %) |
| --- | --- |
| block PP (MFR 100) | 44-67 |
| SEBS | 5-20 |
| EP | |
| EBM | |
| talc (average particle size 4-5 μm) | 28-36 |

TABLE 2

| blend material | blend rate (weight %) |
| --- | --- |
| block PP (MFR 100) | 39-62 |
| homo PP | 5-15 |
| SEBS | 5-20 |
| EP | |
| EBM | |
| talc (particle size 4-5 μm) | 28-36 |

Figure 1A:
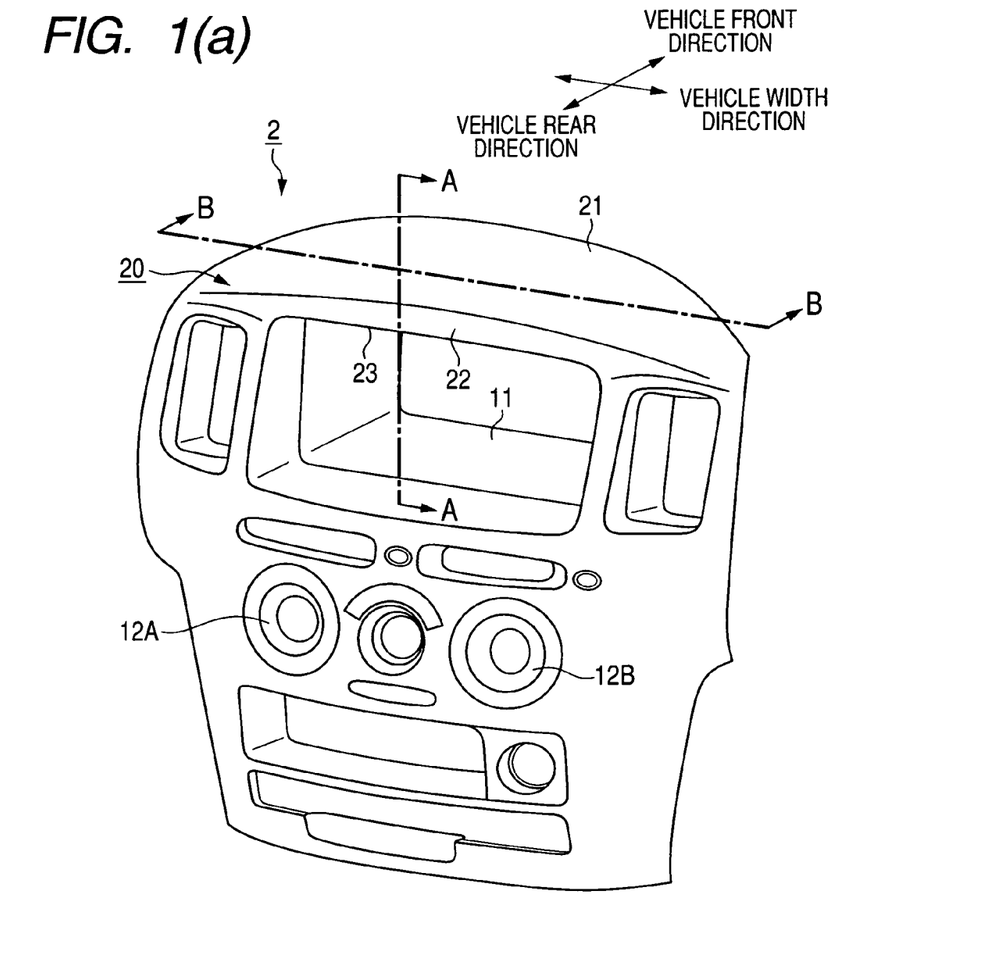
Figure 1B:
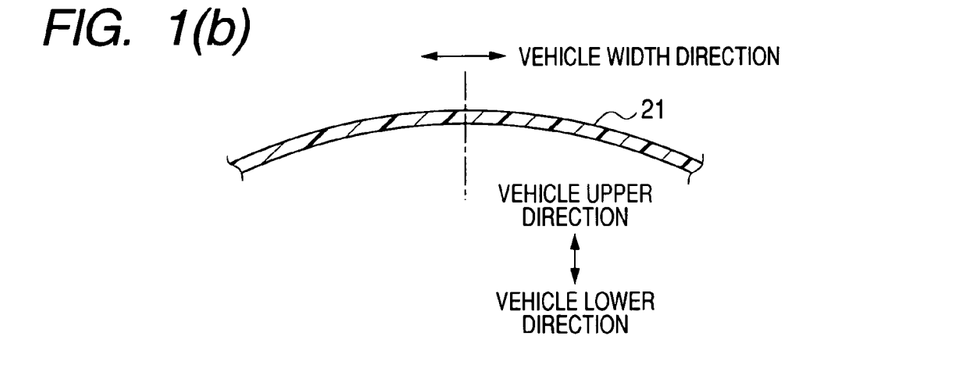
Figure 2:
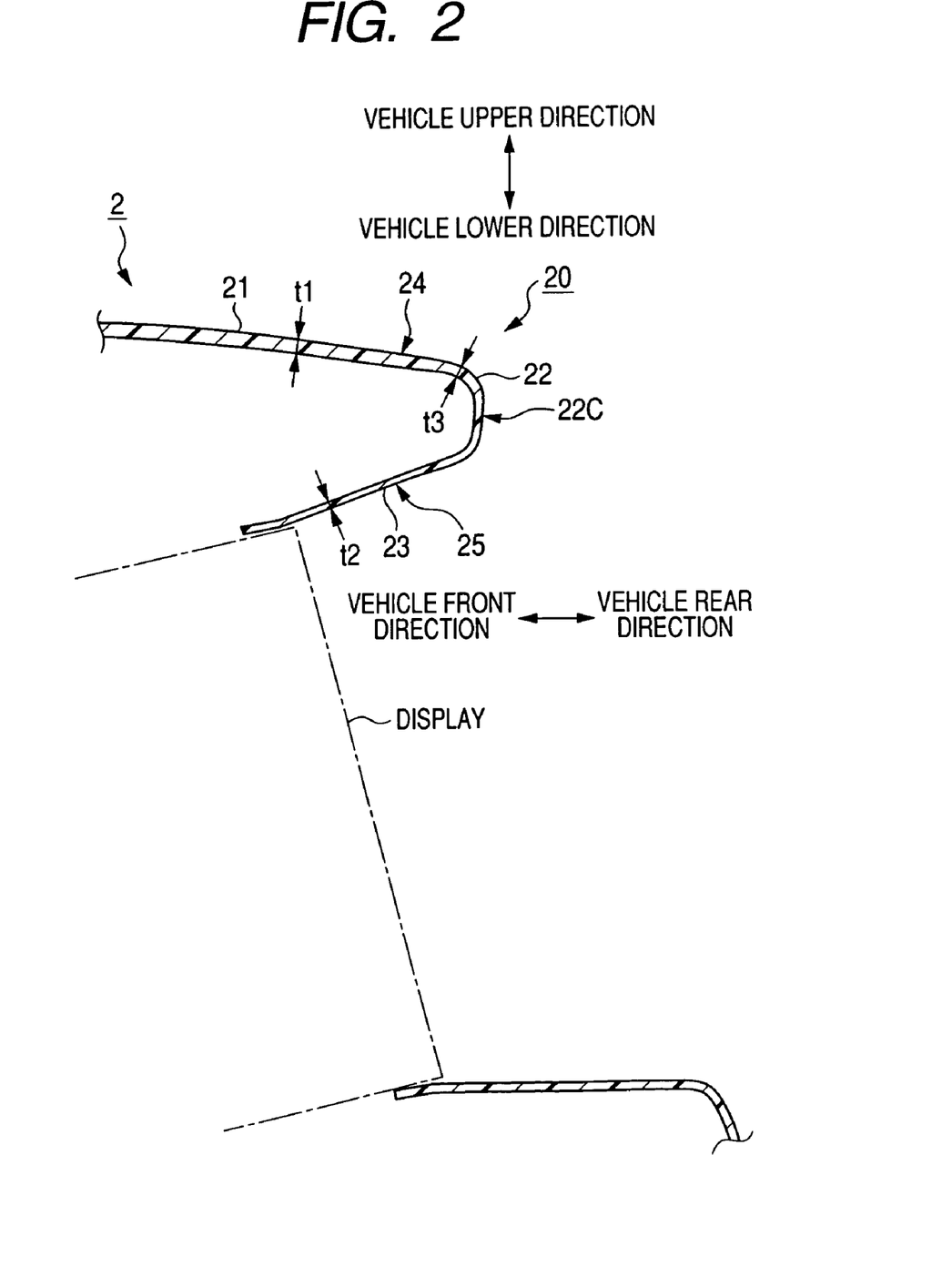
FIG. 2 is a sectional view taken along a line A-A of FIG. 1.

FIG. 1(a) is a perspective view showing a perspective structure of a center cluster panel according to the embodiment and FIG. 1(b) is a sectional view taken along a line B-B of the perspective view. Further, FIG. 2 is a sectional view taken along a line A-A of FIG. 1.

As shown by FIG. 1(a), a center cluster panel 2 is formed with a containing portion 11 for containing a display of a car navigation system, attaching portions 12A and 12B for attaching an operation dial of an air conditioner and the like. Further, as shown by FIG. 2, the center cluster panel 2 is formed with a projected portion 20 projected in a vehicle rear direction at an upper portion thereof. The projected portion 20 is constituted by an upper panel 21 extended in the vehicle rear direction and disposed at an uppermost portion of the center cluster panel 2, a curved face panel 22 connected to a vehicle rear portion of the upper panel 21 and directed in a vehicle front direction by being bent from a connected portion 24 of the same, and a lower panel 2 connected to the curved face panel 22, extended in the vehicle front direction and disposed on a vehicle lower side of the upper panel 21. As shown by FIG. 1(b), the upper panel 21 thereamong is formed such that the more proximate to a center position in a vehicle width direction, the more vehicle upper side the portion is disposed. Further, as shown by FIG. 2, the upper panel 21 is formed by a curved face of a curvature extremely smaller than that of the curved face panel 22. Further, as shown by FIG. 2, the upper panel 21 is attached to an instrument panel in a mode in which a vehicle front side thereof is inclined to a vehicle upper side. Further, a lower panel 23 is attached to the instrument panel in a mode in which a vehicle front side thereof is inclined to a vehicle lower side. That is, the upper panel 21 and the lower panel 23 are arranged such that the more on the vehicle rear side, the more proximate the panels to each other. Further, as shown by a two-dotted chain line in FIG. 2, the display of the car navigation system is contained to a lower side of the projected portion 20.

Meanwhile, in order to achieve light-weighted formation of a vehicle, the center cluster panel 2 including the above-described projected portion 20 is formed such that a wall thickness thereof becomes extremely thin. However, with regard to the projected portion 20 particularly having a possibility of being brought into contact with a passenger, when the wall thickness is uniformly thinned, a rigidity thereof is reduced, and there is a concern that crack is brought about at the projected portion 20 by bringing the head portion of the passenger into contact with the projected portion 20 in impacting the vehicle.

Hence, the upper panel 21 and the lower panel 23 are formed such that wall thicknesses t1 and t2 thereof are respectively uniform, and the wall thickness t1 (for example 1.5 mm) of the upper panel 21 is set to be thicker than the wall thickness t2 (for example, 1.0 mm) of the lower panel 23 (t1>t2). Thereby, the rigidity of the upper panel 21 is promoted while achieving light-weighted formation by making the wall thickness t2 of the lower panel 23 as thin as possible. Further, the wall thickness t1 of the upper panel 21 and the wall thickness t2 of the lower panel 23 are not limited to 1.5 mm and 1.0 mm but so far as a large or small relationship of t1>t2 is satisfied, the wall thickness t1 of the upper panel 21 can pertinently be set to a range of 1.2 mm through 2.5 mm and the wall thickness t2 of the lower panel 23 can pertinently be set to a range of 0.8 mm through 1.5 mm.

Meanwhile, in a case in which a constitution of setting the wall thickness t1 of the upper panel 21 thicker than the wall thickness t2 of the lower panel 23, that is, a constitution in which the wall thickness of the projected portion 20 partially differs in the center cluster panel 2 in this way, when a portion of considerably changing the wall thickness is present, in a case of bringing the head portion PH of the passenger and the upper panel 21 or the curved face panel 22 into contact with each other in impacting the vehicle, there is a concern that a stress is concentrated on the portion by an impact force and crack is brought about at the portion.

Figure 3:
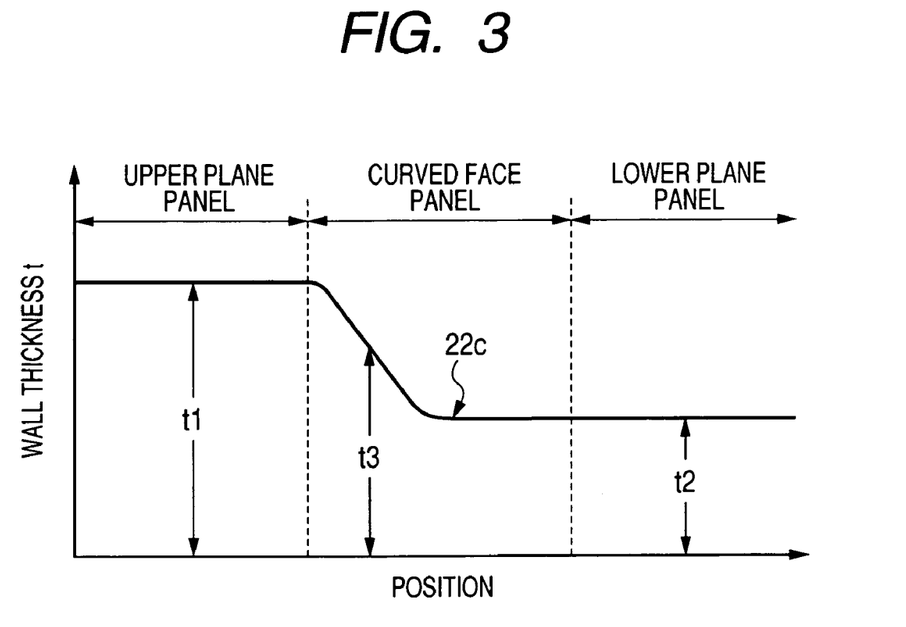
FIG. 3 is a graph showing a distribution of a wall thickness of a projected portion of the embodiment.

Hence, the above-described stress concentration is restrained from being brought about by setting a wall thickness t3 of the curved face panel 22 and a wall thickness distribution thereof as follows. That is, as shown by FIG. 3, the curved face panel 22 is formed such that the wall thickness t3 is equal to the wall thickness t1 (=t3) of the upper panel 21 at a portion 24 thereof connected to the upper panel 21. Further, the curved face panel 22 is formed such that the more proximate to the lower panel 23 from the connected portion 24 of the upper panel 21, the more thinned the wall thickness t3 gradually. Further, the curved face panel 22 is formed such that the wall thickness t3 is equal to the wall thickness t2 (=t3) of the lower panel 23 at a center portion 22C between the upper panel 21 and the lower panel 23. Further, the curved face panel 22 is formed such that a wall thickness from the center portion 22C to a portion 25 thereof connected with the lower panel 23 is equal to the wall thickness of the lower panel 23 and uniform. By the constitution, the portion of considerably changing the wall thickness is not present at the projected portion 20.

Meanwhile, the projected portion 20 is formed to project to the vehicle rear side at the upper portion of the center cluster panel 2, and therefore, the more vehicle upper side of the projected portion 20 the portion is disposed, the higher the possibility of being brought into contact with the head portion of the passenger in impacting the vehicle. That is, the possibility of being brought into contact with the head portion PH of the passenger becomes higher in an order of the lower panel 23, the curved face panel 23 and the upper panel 21 the projected portion 20. Further, when further describing the curved face panel 22, whereas the more proximate to the upper panel 21 the portion, the higher the possibility of being brought into contact with the head portion PH of the passenger, the more proximate to the lower panel 23 the portion, the lower the possibility of being brought into contact with the head portion PH of the passenger. Although the possibility is low when compared with the lower panel 23 in this way, also with regard to the curved face panel 22, similar to the upper panel 21, there is a possibility of being brought into contact with the head portion PH of the passenger. Therefore, in consideration thereof, it is necessary also for the curved face panel 22 to set the rigidity higher than that of the lower panel 23 similar to the upper panel 21. However, the curved face panel 22 is constituted by the bent curved face, and therefore, in comparison with the upper panel 21 or the lower panel 23 constituted by a curved face of a curvature smaller than that of the curved face panel 22, when the thickness stays the same, the rigidity is increased. Therefore, even when the wall thickness t3 of the curved face panel 22 becomes gradually thin to the wall thickness t2 of the lower panel 23 by constituting a reference by the wall thickness t1 of the upper panel 21, the rigidity is not extremely reduced and the rigidity of the curved face panel 22 becomes higher than that of the lower panel 23.

Figure 4:
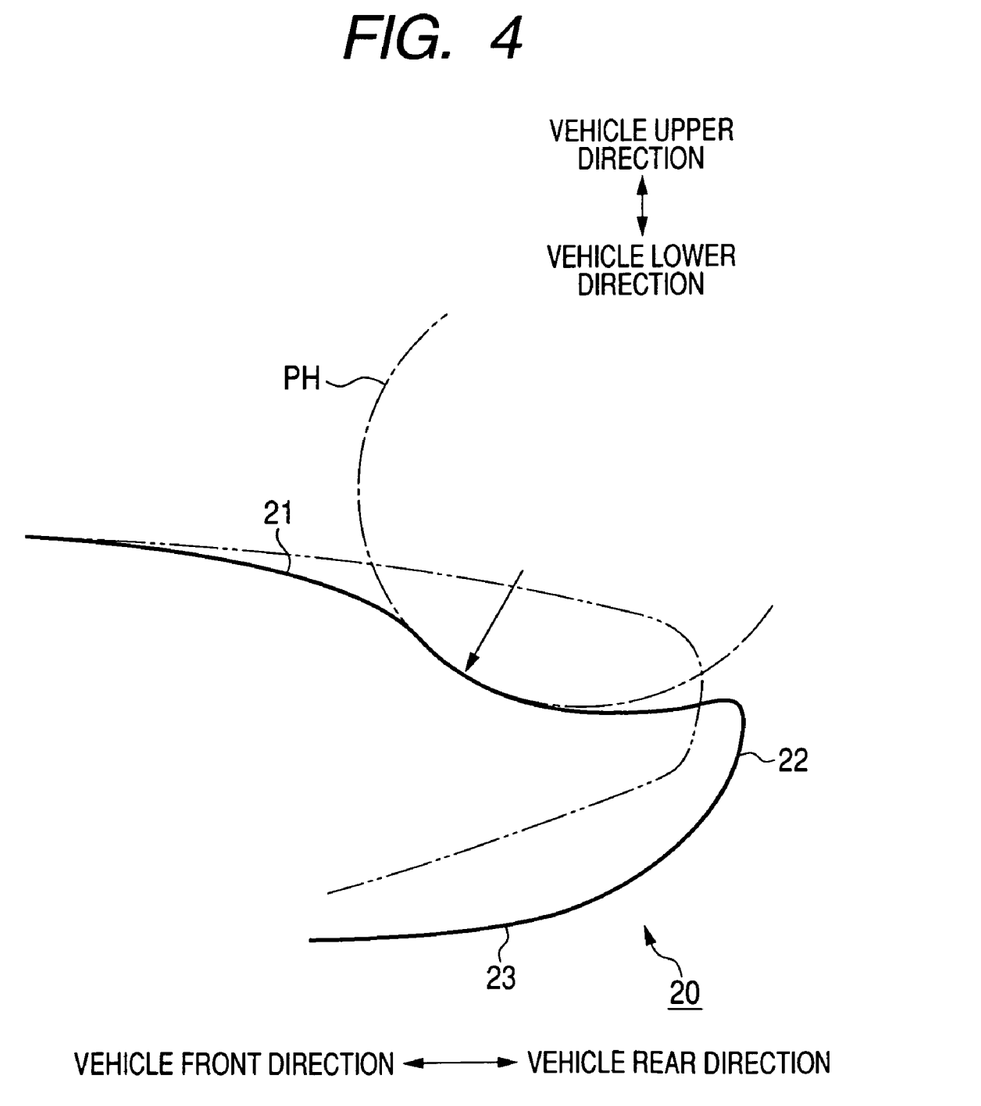
FIG. 4 is a sectional view showing an operation of the vehicular center cluster panel of the embodiment.

FIG. 4 is a diagram showing a sectional shape of the projected portion 20 before and after impact of the head portion PH of the passenger. Further, in the drawing, a bold line indicates an example of the sectional shape of the projected portion 20 after impact and a two-dotted chain line indicates the sectional shape of the projected portion 20 after impact.

As shown by the bold line of FIG. 4, when the head portion PH of the passenger is impacted to the curved face panel 22, the curved face panel 22 is deformed such that a curvature thereof is increased and a center portion thereof is projected in the vehicle rear direction, and the upper panel 21 is displaced to sink to the vehicle lower side. Therefore, there is not brought about a local deformation of inducing to bring about crack in accordance with the deformation of the upper panel 21. Further, although with regard to the curved face panel 22, the rigidity is made to be lower than that of the upper panel 21, the rigidity higher than that of the lower panel 23 is ensured. Therefore, even when the upper panel 21 is deformed to the vehicle lower side as described above, crack is not brought about in accordance therewith.

According to the vehicular center cluster panel according to the embodiment explained above, advantages enumerated below are achieved.

(1) The upper panel 21 and the lower panel 23 are formed such that the respective wall thicknesses become uniform and the wall thickness of the upper panel 21 is set to be thickener than the wall thickness of the lower panel 23. That is, with regard to the upper panel 21 having the high possibility of being brought into contact with the head portion PH of the passenger fallen to the front side in impacting the vehicle, the wall thickness is set to be thicker than that of the lower panel 23 having the low possibility of the contact. Therefore, even when light-weighted formation of the center cluster panel 2 is achieved by thinning the wall thickness of the projected portion 20, with regard to the upper panel 21, the rigidity is ensured, and therefore, crack is not brought about when the upper panel 21 is brought into contact with the head portion PH of the passenger and an impact force can preferably be absorbed.

(2) The curved face panel 22 is formed such that the wall thickness is equal to the upper panel 21 at the connected portion 24 of the upper panel 21 and formed such that the more proximate to the lower panel 23 from the connected portion 24, the more thinned the wall thickness gradually.

Thereby, the above-described stress concentration can be restrained from being brought about and the impact absorbing function of the projected portion 20 can preferably be avoided from being reduced owing to occurrence of crack. Further, by setting the wall thickness of the curved face panel 22 in this way, the more proximate to the lower panel 23 the portion in the curved face panel 22, that is, the lower the possibility of being brought into contact with the head portion PH of the passenger in impacting the vehicle at the portion, the thinner the wall thickness is set, and therefore, light-weighted formation of the center cluster panel 2 can preferably be achieved by maintaining the impact absorbing function of the projected portion 20.

(3) The curved face panel 22 is formed such that at the center portion 22C between the upper panel 21 and the lower panel 23, the wall thickness is equal to that of the lower panel 23. That is, whereas with regard to the portion of the curved face panel 22 on the side of the upper panel 21 from the center portion 22C, the more proximate to the upper panel 21, the thicker the wall thickness, with regard to the portion on the side of the lower panel 23 from the center portion 22C, the wall thickness is made to be equal to that of the lower panel 23 to be thinned relatively. Thereby, while achieving light-weighted formation of the center cluster panel 2, the rigidities of the upper panel 21 and the curved face panel 22 can be ensured and the impact absorbing function can be maintained in the form in conformity with a mode of being brought into contact with the head portion PH of the passenger in impacting the vehicle.

(4) The upper panel 21 is provided with a shape of being bent gradually in the vehicle width direction, that is, a shape in which the more proximate to the center position in the vehicle width direction the portion, the more disposed to the vehicle upper side, and therefore, for example, in comparison with the constitution of constituting the shape by a shape of a complete plane, the rigidity becomes high. Therefore, also in this respect, the impact force can preferably be absorbed while restraining occurrence of crack. Further, when the head portion PH of the passenger is brought into contact therewith, the impact force can preferably be absorbed without bringing about crack. Further, the upper panel 21 is constituted by the shape in which the center portion is bent to be disposed on the vehicle upper side, and therefore, an amount of capable of deforming the center portion of the upper panel 21 in which there is a concern the most that the portion is brought into contact with the head portion PH of the passenger becomes larger than that of other portion. Therefore, the impact force can further effectively be absorbed.

(5) As the molding material of the center cluster panel 2, particularly, the material having the physical properties that the elastic modulus of bending at 23° C. is 2500 MPa through 3300 MPa and a measured value by Izod test at 23° C. is 200 J/m through 260 J/m is adopted. Thereby, the impact absorbing property of the center cluster panel 2 can be promoted.

(6) When the wall thickness of the center cluster panel 2 is made to be as thin as about 1.0 mm in the embodiment, in comparison with the case of the wall thickness of, for example, about 3 mm, the fluidity of the resin material in molding is deteriorated to pose a problem of an increase in a time period required for molding the resin or an increase in a failure rate of a molded product. In this respect, according to the embodiment, as a material of molding the center cluster panel 2, particularly, the material having the physical property that the melt mass flow rate (MFR) is 40 through 50 g/10 min is adopted. Thereby, the fluidity of the resin material can be promoted and even when a flow length or a flow area of the resin material is increased, the increase in the time period required for molding the resin can be restrained and the increase in the failure rate of the molded product can be restrained.

(7) As talc blended to the resin material, mixed talc of an average particle size of 4 through 5 μm mixed with talc of a particle size of 1 μm and talc of a particle size of 4 through 5 μm is adopted. Thereby, the elastic modulus of bending and the measured value by Izod test can be promoted. Further, the mixed talc is constituted by talc of the particle size of 1 μm significantly contributing to the physical property of the material and talc of the particle size of 4 through 5 μm which is generally more inexpensive than talc of the particle size of 1 μm, and therefore, cost can be restrained to be low while realizing the physical property of the material.

Further, the vehicular center cluster panel according to the invention is not limited to a constitution exemplified in the embodiment but can be embodied as, for example, a mode as follows of pertinently changing the constitution.

Figure 5:
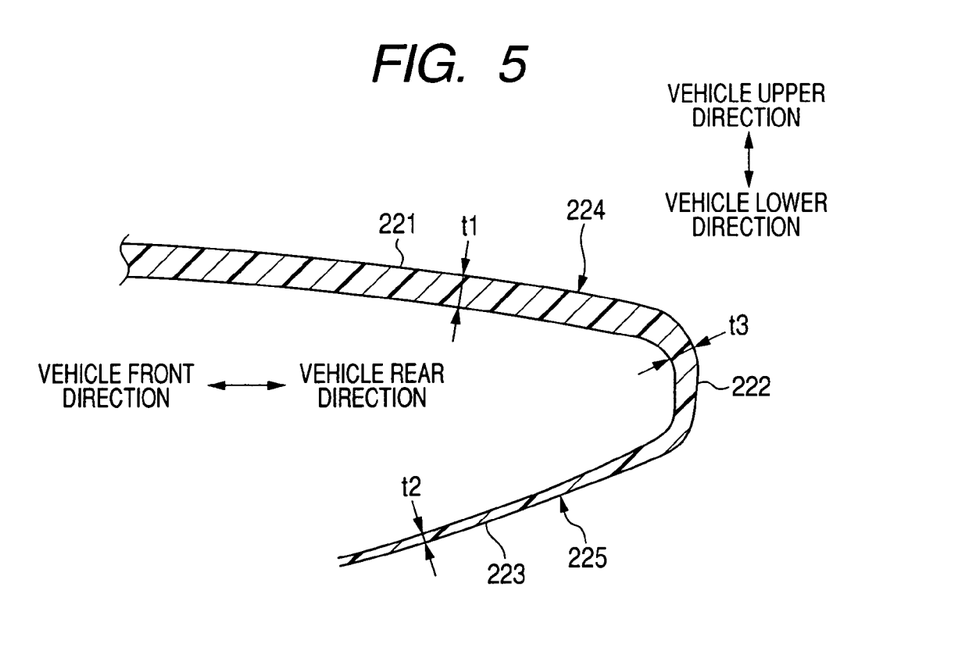
FIG. 5 is a partial sectional view showing a partial sectional structure of a modified example of the vehicular center cluster panel according to the invention.
Figure 6:
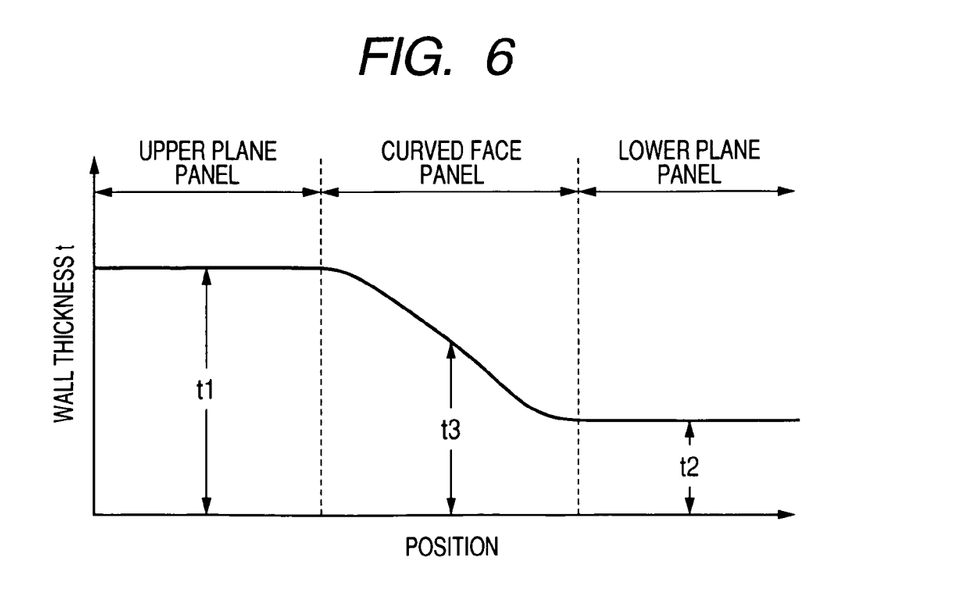
FIG. 6 is a graph showing a distribution of a wall thickness of a projected portion of the modified example.

Although according to the embodiment, the curved face panel 22 is formed such that at the center portion 22C between the upper panel 21 and the lower panel 23, the wall thickness t3 is equal to the wall thickness t2 of the lower panel 23, a mode of setting the wall thickness t3 of the curved face panel 22 is not limited thereto. Otherwise, as shown by FIG. 5 and FIG. 6, a wall thickness t3 of a curved face panel 222 can also be set such that the more proximate to the lower panel 223, the more thinned the wall thickness t3 gradually from a portion 224 thereof connected with an upper panel 221 over to a portion 225 thereof connected with the lower panel 223 and the wall thickness t3 becomes equal to a wall thickness t2 of the lower panel 223 at the connected portion 225 of the lower panel 223.

Figure 7:
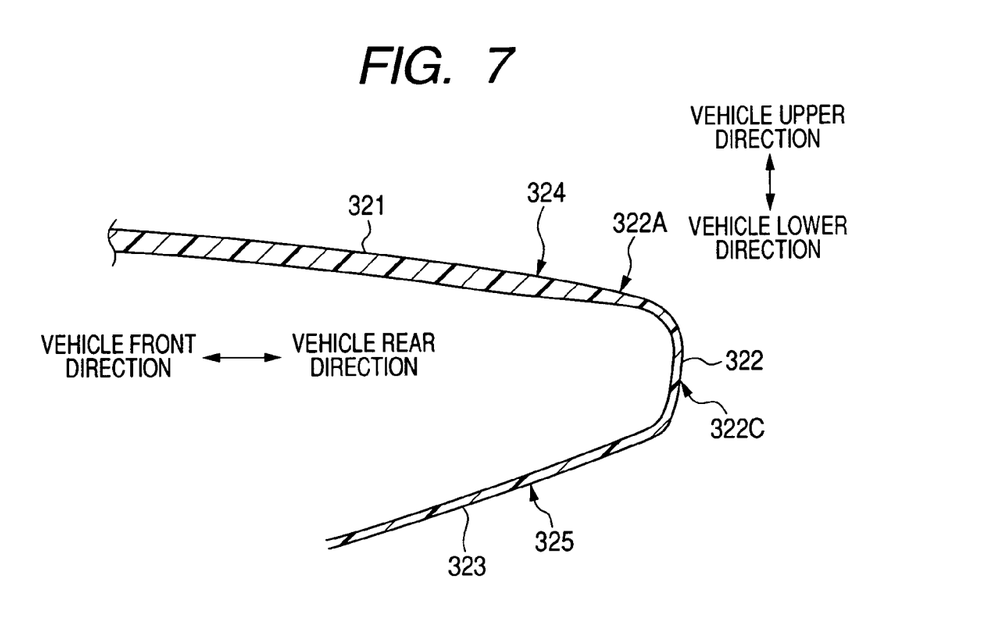
FIG. 7 is a partial sectional view showing a partial sectional structure of other modified example of the vehicular center cluster panel according to the invention.
Figure 8:
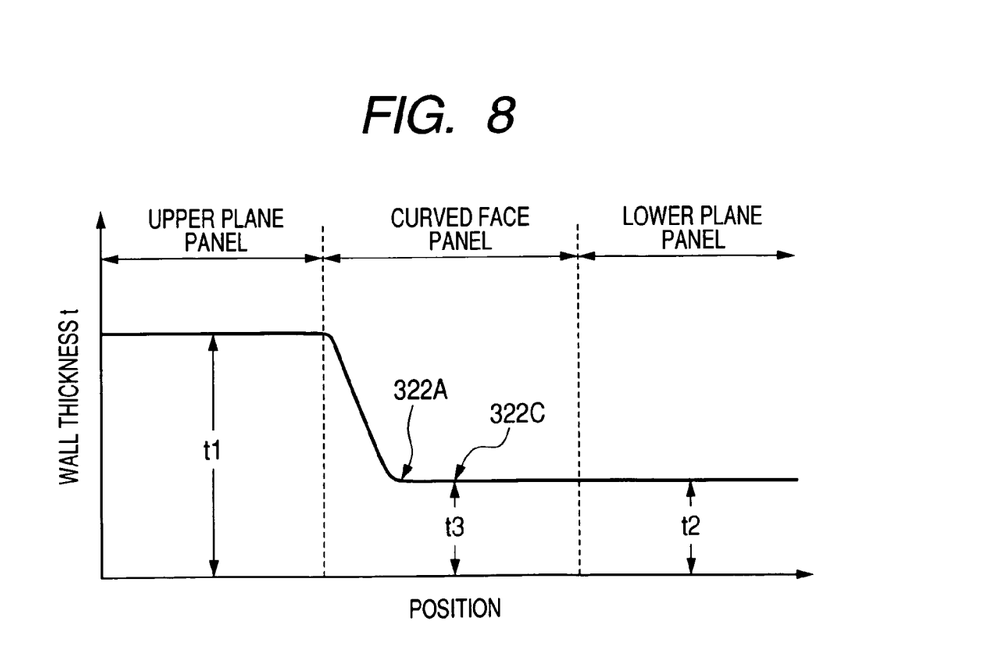
FIG. 8 is a graph showing a distribution of a wall thickness of a projected portion of the other modified example.

Further, on the other hand, as shown by FIG. 7 and FIG. 8, a wall thickness t3 of a curved face panel 322 can also be set such that the more proximate to the lower panel 323, the more thinned the wall thickness t3 gradually from a portion 324 thereof connected with an upper panel 321 over to a portion 322A on a side of the upper panel 321 of a center portion 322C between the upper panel 321 and the lower panel 323, at the portion 322A, the wall thickness t3 becomes equal to a wall thickness t2 of the lower panel 223. In sum, the upper panel and the lower panel may be formed such that the respective wall thicknesses become uniform, the upper panel may be formed such that the wall thickness is set to be thicker than that of the lower panel, the curved face panel may be formed such that the wall thickness becomes equal to that of the upper panel at the connected portion with the upper panel, and may be formed such that the more proximate to the lower panel from the connected portion the more thinned the wall thickness gradually.

Further, the rigidity of the projected portion may further be adjusted in the form in conformity with the mode of being brought into contact with the head portion of the passenger in impacting the vehicle by pertinently forming a rib connecting the upper panel and the lower panel between the upper panel and the lower panel. Further, in this case, it is preferable to form a plurality of ribs in the vehicle width direction extended in a vehicle front and rear direction at inside of the projected portion.

What is claimed is:

1. A vehicular center cluster panel that is a center cluster panel made of a resin and attached to a center portion of an instrument panel of a vehicle, the vehicular center cluster panel comprising:

a projected portion, including, an upper panel extended to a rear side of the vehicle and disposed at a topmost portion of the center cluster panel, a curved face panel connected to a rear end of the upper panel at a connected portion and directed to a front side of the vehicle by being bent from the connected portion, and a lower panel connected to the curved face panel, wherein the lower panel is extended toward a front of the vehicle and located on a lower side of the upper panel;

the upper panel and the lower panel are formed such that respective wall thicknesses of the upper panel and the lower panel are uniform;

the wall thickness of the upper panel is set to be greater than the wall thickness of the lower panel;

a wall thickness of the curved face panel is formed to be equal to the wall thickness of the upper panel at the connected portion;

the wall thickness of the curved face panel gradually decreases in a direction towards the lower panel from the connected portion;

a display is located at a lower side of the upper panel; and at a rear of the display and below the lower panel, the center cluster panel is constructed to form a space to accommodate downward deformation of the lower panel when an impact is applied to the upper panel by a passenger.

2. The vehicular center cluster panel according to claim 1, wherein the wall thickness of the curved face panel is formed to be equal to the wall thickness of the lower panel at a location between the upper panel and the lower panel.

3. The vehicular center cluster panel according to claim 1, wherein the wall thickness of the upper panel is in a range of 1.2 mm to 2.5 mm.

4. The vehicular center cluster panel according to claim 1, wherein the wall thickness of the lower panel is in a range of 0.8 mm to 1.5 mm.

5. The vehicular center cluster panel according to claim 1, wherein a distal end of the lower panel, which extends toward a front of the vehicle, is located directly above the display.

* * * * *